United States Patent [19]

Goron

[11] 4,302,170
[45] Nov. 24, 1981

[54] ACCUMULATOR HEAD HAVING A PISTON WITH A SELF-WIPING FACE

[75] Inventor: John Goron, Bridgewater, N.J.

[73] Assignee: Midland-Ross Corporation, Cleveland, Ohio

[21] Appl. No.: 170,051

[22] Filed: Jul. 18, 1980

[51] Int. Cl.³ .............................................. B29D 23/04
[52] U.S. Cl. .................................. 425/133.1; 264/514; 264/515; 264/540; 264/541; 425/532; 425/376 R; 425/380; 425/381; 425/466; 425/467
[58] Field of Search ...................... 425/133.1, 532, 380, 425/381, 466, 465, 467, 376 R, 462; 264/514–515, 540–541, 209.1, 209.8

[56] References Cited

U.S. PATENT DOCUMENTS

| | | | |
|---|---|---|---|
| 3,341,043 | 9/1967 | Santelli | 264/515 |
| 3,386,132 | 6/1968 | Fischer | 425/381 |
| 3,457,337 | 7/1969 | Turner | 425/532 |
| 4,063,865 | 12/1977 | Becker | 425/380 |
| 4,120,633 | 10/1978 | Feverherm | 425/380 |

*Primary Examiner*—Jeffery R. Thurlow
*Attorney, Agent, or Firm*—Harlan E. Hummer

[57] ABSTRACT

An accumulator head is described as having an annular accumulation chamber, an annular ring-piston movable axially through the chamber, an inlet through which plasticized resinous material is forced into the chamber between opposing ends thereof, and a special feature built into the ring-piston which causes material, flowing into the chamber, to wipe the face or tip of the piston and keep it clean and free of any material. A discharge passageway leads from the accumulation chamber to a discharge orifice adjacent which a parison is formed by resinous material from the chamber. Another inlet is provided in the discharge passageways as a means of providing a final, outer layer or laminate of material to that flowing out the discharge passageway from the chamber.

9 Claims, 1 Drawing Figure

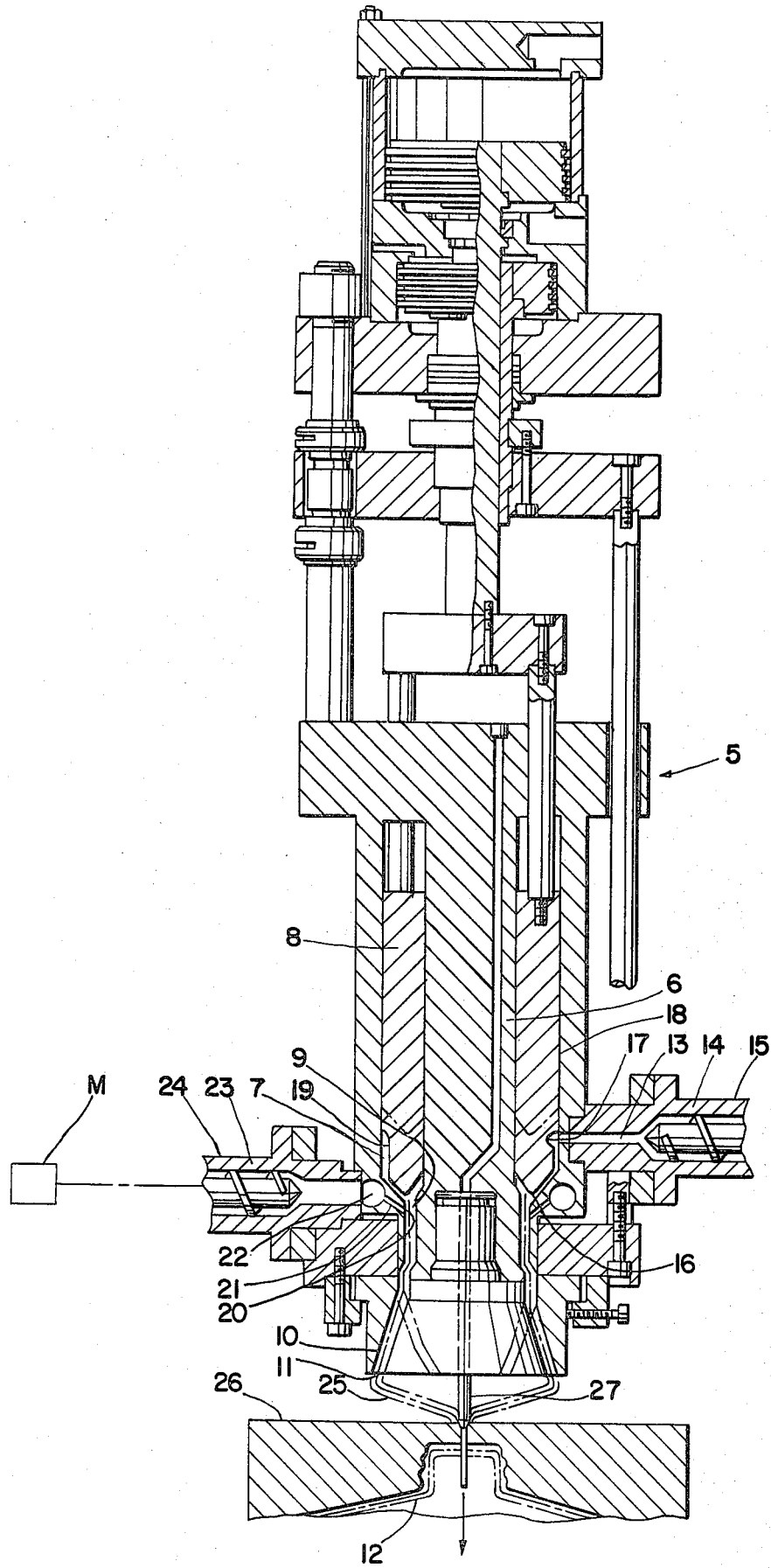

ACCUMULATOR HEAD HAVING A PISTON WITH A SELF-WIPING FACE

BACKGROUND OF THE INVENTION

The invention relates to an accumulator head, especially one that is useful in the production of a multi-layer parison which, for example, is used in the formation of a plastic fuel cell or tank, wherein it is desireable to have an inner layer which is impervious to liquid, covered by an outer layer of highly durable shock resistant material.

U.S. Pat. No. 3,386,132 is relevant to the invention in that it shows an accumulator head having an accumulation chamber with an annular inlet that is located in the outer wall of the chamber intermediate opposing ends of the chamber whereat the ring-piston resides when in its fully retracted and extended positions within the chamber.

U.S. Pat. No. 3,298,061 is also relevant in that it shows a solid cylindrical ram or plunger having a mechanism for wiping the outer tip or pushing face of the plunger free of material which has a tendency to cling to the face and create problems. This is found to be especially true with annular, ring-type pistons which are used in accumulator heads where the annular inlet, through which material is fed into the accumulation chamber, communicates with the chamber between opposing ends of the chamber.

Briefly stated, the invention is in an accumulator head having an annular accumulation chamber which has an open, discharge end opposite a closed end that is sealed by an annular ring-piston which is movable axially in the chamber to force, for example, resinous material that has been charged to the chamber, therefrom. A discharge passageway extends from the discharge end of the chamber and leads to a discharge orifice through which material, from the chamber, is forced to form a parison for subsequent blow molding. Means, including an inlet passageway, are provided by which material is charged into the accumulation chamber intermediate the open and closed ends thereof.

The ring-piston, adjacent its tip or pushing face which first encounters material in the chamber, is provided with means for wiping the face and keeping it clean and free of the material being charged to the chamber, such means including an annular groove which is recessed inwardly in the outer circumferential wall or surface of the piston. The annular groove directly opposite the inlet passageway leading to the accumulation chamber, is in communication with a slotted or flat recess which extends from the groove longitudinally of the ring-piston through the pushing face for communication with the chamber, the recess having a longitudinal axis which is generally normal to the plane of the groove. The recess helps in the removal of material which tends to congregate in this particular area of the groove and pushing face of the piston, as the two streams of resinous material, divided upon contact with the ring-piston, are joined together on the backside of the ring-piston farthest from the inlet passageway. The resinous material as it moves from the groove into the chamber, wipes the pushing face of the piston to clean it and remove any material which clings to the piston.

DESCRIPTION OF THE DRAWING

The following description of the invention will be better understood by having reference to the accompanying drawing which is a section of an accumulator head that is made in accordance with the invention.

DETAILED DESCRIPTION OF THE DRAWING

With reference to the drawing, there is shown an accumulator head 5 which comprises a centrally disposed, cylindrical mandrel 6 that is surrounded by an annular accumulation chamber 7 in which an annular ring-piston 8 is mounted for recpirocating axial movement. The accumulation chamber 7 has a discharge end 9 from which resinous material is forced by the ring-piston 8 into an annular discharge passageway 10 that leads to a discharge orifice or opening 11 which is a specially configured annular slot that is used in the formation of a parison 12 from the slug of resinous material that is ejected from the accumulation chamber 7 during operation of the ring-piston 8 from its fully retracted position, shown in dotted line, to its fully extended position, shown in full line.

An inlet passageway 14 leads from the accumulation chamber 7 to the barrel 14 of any suitable main feed screw extruder 15 that is used to move, for example, plasticized resinous material, under pressure, into the accumulation chamber 7.

The ring-piston 8, adjacent its distal end or free outer tip 16 closest the discharge end 9 of the accumulation chamber 7, is provided with an annular groove 17 which is concavely recessed inwardly in the outer circumferential surface or wall 18 of the ring-piston 8. The groove 17 is aligned with the inlet passageway 13, when the ring-piston 8 is in its fully extended position within the accumulation chamber 7. A slotted or flat recess 19, as described in U.S. Pat. No. 3,298,061 is formed in the outer wall 18 of the ring-piston 8 and extends from the groove 17 longitudinally of the ring-piston 8 through the tip 16 for communication with the accumulation chamber 7, and is directly opposite the inlet passageway 13 and is provided to prevent the accumulation of material in this area, caused when the two divided streams of material flowing around the ring-piston 8 in the groove 17, come together and join. Resinous material, as it flows outwardly of the groove 17 and recess 19 into the accumulation chamber 7, wipes the tip or pushing face 16 of the ring-piston 8 to keep it clean and free of any material which normally tends to accumulate against the face 16 of the ring-piston 8 and the farthest side of the ring-piston 8 from the inlet passageway 13.

An annular entrance opening 20 is provided in the discharge passageway 10 between the discharge orifice 11 and the discharge end 9 of the accumulation chamber 7. A conically shaped annular entrance passageway 21 leads from the entrance opening 20 to an annular compartment 22 which is in communication with the barrel 23 of any suitable secondary feed screw extruder 24 which is similarly provided to force, for example, plasticized resinous material, under pressure, into the discharge passageway 10 to provide a final, outer layer or laminate of resinous material to that being forced from the accumulation chamber 7 by the annular ring-piston 8. Any suitable means M can be used to synchronize operation of the secondary feed screw extruder 24 with the operation of the ring-piston 8, to produce a laminated flow of resinous material 25 from the discharge orifice 11, to produce the parison 12 which is immediately enclosed in an adjacent blow mold 2 and inflated by any suitable means, e.g. an air nozzle 27 carried by the accumulator head 5, to form the finished laminated product.

In operation, assuming that the ring-piston 8 is in its fully extended position where the groove 17 of the ring-piston 8 is generally aligned with the inlet passageway 13, the main feed screw extruder 15 is operated to initially force resinous material into the accumulation chamber via the groove 17 and flat recess 19 so that the resinous material acts upon and cleans the pushing face 16 of the ring-piston 8 as the ring-piston 8 is forced rearwardly. Resinous material from the inlet passageway 13 acts normally upon the pushing face 16 to move the ring-piston 8 to its most rearwardly or fully retracted position, once the groove 17 passes rearwardly out of communication with the inlet passageway 13. The ring-piston 8 is then operated and moved axially from its fully retracted position through the accumulation chamber 7 towards the discharge end 9 of the accumulation chamber 7 to force resinous material, in the chamber, into the discharge passageway 10. The secondary feed screw extruder 24 is simultaneously operated to move, for example, a different resinous material into the compartment 22 and the annular entrance passageway 21 which is sufficiently long to form the material into a smooth homogeneous tube for movement into the discharge passageway 10 to form an outer laminate for the inner layer of resinous material moving passed the entrance opening 20 in the discharge passageway 10. The two layers or laminates of resinous material flow from the discharge orifice 11 to form the parison 12 which is immediately enclosed in the blow mold 26 and conventionally inflated to form the finished product.

Thus, there has been described a unique accumulation head which has a special inlet passageway through which resinous material is moved into the accumulation chamber via a specially designed groove that is in the annular ring-piston adjacent its distal end or tip which is first-to-encounter the resinous material in the chamber, as the ring-piston is moved from its fully retracted position to its fully extended position within the accumulation chamber. The resinous material, as it moves outwardly through from the groove into the accumulation chamber, continuously wipes the tip or pushing face of the ring-piston to keep it clean and free of any material which normally accumulates in this particular area of the ring-piston. In another aspect of the invention, a secondary feed screw extruder is provided to force material into the discharge passageway to form a final, outer laminate for the inner layer of resinous material moving through the discharge passageway past the entrance opening.

What is claimed is:
1. An accumulator head, comprising:
 (a) an annular, accumulation chamber having a longitudinal axis and a pair of opposing ends, one of which is a configured end through which, for example, resinous material leaves the chamber;
 (b) an annular ring-piston movable axially within the annular accumulation chamber to force resinous material from the accumulation chamber through the discharge end thereof, the piston having a free outer tip which is shaped to correspond generally to the configuration of the discharge end;
 (c) an inlet passageway communicating with the accumulation chamber between opposing ends of the chamber, the inlet passageway extending radially outwardly from the chamber in a direction away from the longitudinal axis of the chamber;
 (d) means coacting with the inlet passageway for forcing resinous material through the inlet passageway into the accumulation chamber; and
 (e) means coacting with the ring-piston for causing the flow of resinous material into the accumulation chamber to wipe the tip of the piston to clean the tip and prevent accumulation of material thereagainst, the means coacting with the ring-piston including an annular groove that is recessed inwardly in the outer circumferential surface of the ring-piston adjacent the tip thereof in substantial alignment with the inlet passageway when the ring-piston is fully extended into the chamber, the groove, opposite the inlet passageway, having a recess extending therefrom longitudinally of the piston through the tip thereof.

2. The accumulator head of claim 1, wherein the groove has a concave cross-section relative to the longitudinal axis of the chamber.

3. The accumulator head of claim 1 or 2 which includes:
 (f) a discharge orifice in spaced relation from the discharge end of the accumulation chamber;
 (g) a discharge passageway connecting the discharge orifice and discharge end of the accumulation chamber;
 (h) an entrance opening communicating with the discharge passageway between the discharge orifice and discharge end of the accumulation chamber, the entrance opening at least partially surrounding the discharge passageway; and
 (i) means communicating with the entrance opening for forcing resinous material from the opening into the discharge passageway.

4. The accumulator head of claim 3, which includes:
 (j) a conically oriented entrance passageway leading from the entrance opening and formed by parallel walls each of which converge in the direction of the discharge orifice, the entrance passageway leading to an annular compartment which generally surrounds the discharge end of the accumulation chamber.

5. The accumulator head of claim 4, wherein the tip of the ring-piston has a triangular cross-section formed by a pair of lines which converge in the direction of the discharge orifice.

6. The accumulator head of claim 5, which includes:
 (k) a blow mold for enclosing a parison formed adjacent the discharge orifice; and
 (l) means for inflating the parison within the blow mold.

7. The accumulator head of claim 6, wherein the means for forcing resinous material from the accumulation chamber and entrance opening, each include a feed screw-type extruder.

8. The accumulator head of claim 7, which includes means for synchronizing operation of the extruders.

9. An accumulator head, comprising:
 (a) a centrally disposed mandrel;
 (b) an annular accumulation chamber surrounding the mandrel and having a pair of opposing ends, one of which is a configured discharge end and with an annular discharge opening therein;
 (c) an annular ring-piston reciprocable axially in the chamber to force, for example, resinous material in the accumulation chamber through the discharge opening, the ring-piston including:
  (I) a free outer tip for engaging and forcing resinous material from the chamber, the tip having a shape which corresponds to the configuration of the discharge end of the chamber;
  (II) an inner cylindrical wall closest the mandrel and an outer cylindrical wall in spaced relation from the inner wall;
  (III) a circumferential groove recessed inwardly in the outer wall of the ring-piston in the direction of the mandrel and in spaced relation from the tip;
  (IV) a recess in the outer wall of the ring-piston and extending longitudinally of the ring-piston between the groove and tip to form a conduit between the groove and chamber;
(d) an inlet passageway leading radially from the accmulation chamber between the opposing ends thereof in a direction away from the mandrel, the inlet passageway being aligned with a spot on the ring-piston that is substantially 180° from the recess measured around the ring-piston;
(e) means coacting with the inlet passageway for forcing resinous material into the accumulation chamber, at least a portion of the resinous material flowing in the groove and outwardly therefrom past the tip of the ring-piston to wipe and clean the tip;
(f) an annular discharge orifice in spaced relation from the discharge opening in the discharge end of the chamber;
(g) an annular discharge passageway connecting the discharge orifices and discharge opening;
(h) an annular entrance opening surrounding the discharge passageway and communicating therewith between the discharge orifice and discharge opening; and
(i) means for forcing resinous material through the entrance opening into the discharge passageway to form an outer layer of material to that flowing in the discharge passageway past the entrance opening.

* * * * *